United States Patent

[11] 3,547,143

[72] Inventor Justin W. Mills, Jr.
Cinnaminson, N.J.
[21] Appl. No. 779,905
[22] Filed Nov. 29, 1968
[45] Patented Dec. 15, 1970
[73] Assignee Lif-O-Gen, Inc.
Lumberton, N.J.
a corporation of Delaware

[54] SINGLE STAGE PRESSURE REGULATOR
1 Claim, 5 Drawing Figs.
[52] U.S. Cl.......................................... 137/315;
137/454.2, 137/505.11, 137/505.42, 137/613
[51] Int. Cl............................................... F16k 27/00
[50] Field of Search.......................................... 137/454.2,
505.42, 613, 505.11, 505.12, 505.45, 315

[56] References Cited
UNITED STATES PATENTS
| | | | |
|---|---|---|---|
| 2,594,701 | 4/1952 | Wolf | 137/494.2X |
| 1,856,505 | 5/1932 | Persson | 137/505.12X |
| 1,957,972 | 5/1934 | Mills | 137/505.45X |
| 2,669,071 | 2/1954 | St. Clair | 137/454.2X |
| 2,747,607 | 5/1956 | Matasovic | 137/505.11X |
| 3,347,266 | 10/1967 | Hansen | 137/454.2X |

Primary Examiner—Harold W. Weakley
Attorney—Howson and Howson

ABSTRACT: A single-stage fluid pressure regulator wherein the high-pressure area including the pressure regulating valve is contained in an inexpensive cartridge which may be readily removed and replaced in the field.

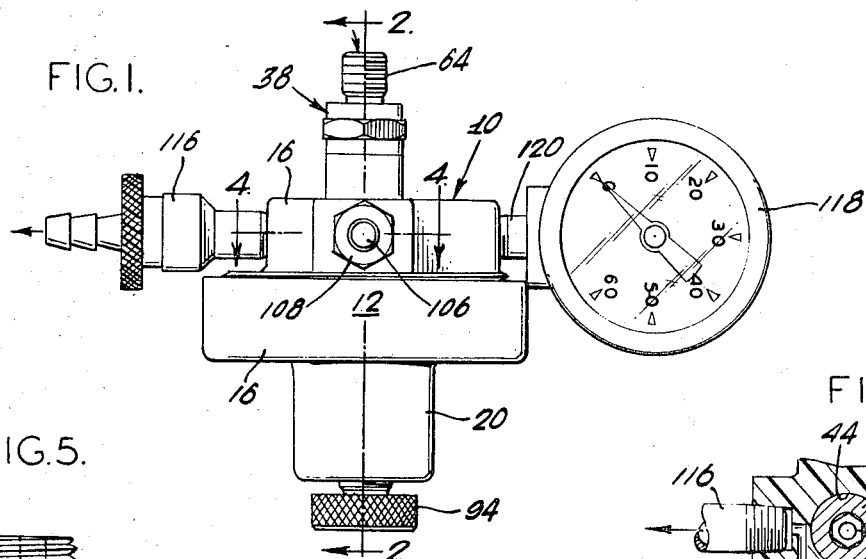
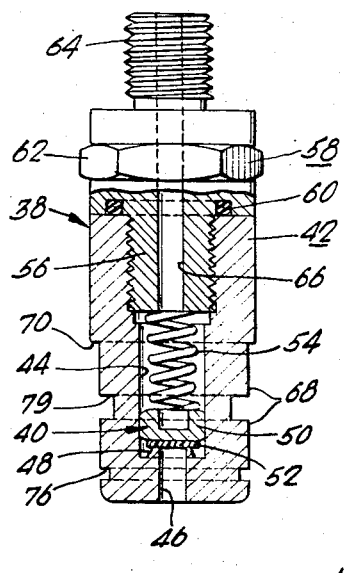
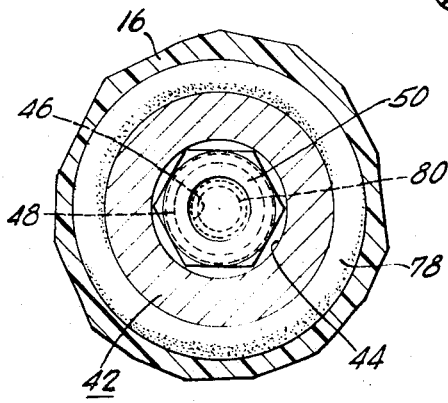
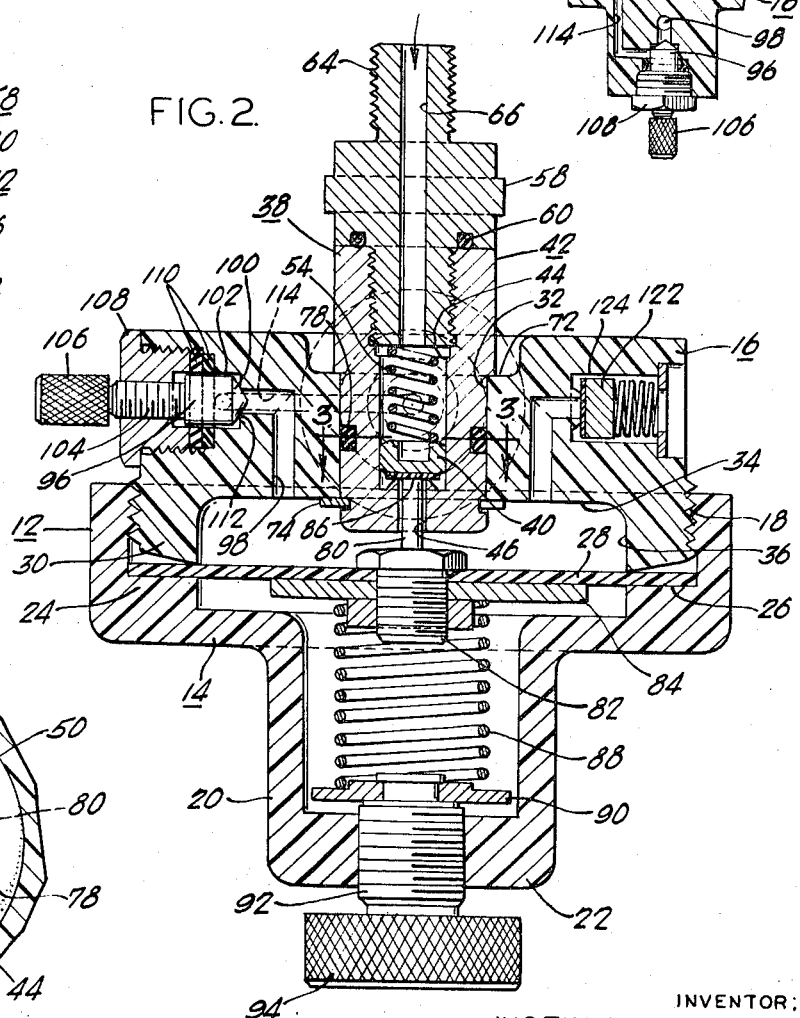
INVENTOR:
JUSTIN W. MILLS, JR.
BY Howson & Howson
ATTYS.

SINGLE STAGE PRESSURE REGULATOR

The present invention relates generally to fluid pressure regulators and relates more particularly to a single-stage regulator which provides pressure and flow control of a fluid passing therethrough and which is characterized by a replaceable high-pressure cartridge which may be inexpensively made from a variety of corrosion resistant materials.

A major problem with fluid pressure regulators currently in use and particularly high-pressure gas regulators is the difficulty of making repairs in the field. It is usually necessary to return the entire regulator unit to the manufacturer or a qualified specialist who has the special tools and know how required to adequately service the device. A further problem with conventional regulators is the expense involved in machining the regulator elements of corrosion resistant materials, especially in those regions which are subjected to high-fluid pressures. In addition, even with the employment of such materials as stainless steel and monel for the high-tolerance critical parts, corrosive attack may still occur with such gases as hydrogen chloride under high pressures and the regulator can in a short time become inoperative.

In the present regulator, the high-pressure region of the regulator is in the form of a readily replaceable cartridge which may be easily machined from corrosion resistant materials. The cartridge may be quickly replaced should wear of the valve elements become a factor or if a cartridge of different material is desired to handle a particular corrosive fluid. The present regulator in addition includes a built-in needle valve for controlling the fluid flow passing therethrough thus eliminating the need for a separate flow control valve in a fluid delivery system.

It is accordingly a first object of the present invention to provide a single-stage fluid pressure regulator wherein the high-pressure region thereof is characterized by a replaceable cartridge.

A further object of the invention is to provide a pressure regulator as described, the replaceable cartridge of which may be readily fabricated from corrosion resistant materials.

An additional object of the invention is to provide a pressure regulator as described having an integral flow control valve.

A still further object of the invention is to provide a pressure regulator as described of a relatively simple design which requires little or no maintenance and which may be economically manufactured.

Additional objects and advantages of the invention will be more readily apparent from the following detailed description of an embodiment thereof when taken together with the accompanying drawings in which:

FIG. 1 is a side elevational view of a pressure regulator constructed in accordance with the present invention;

FIG. 2 is an enlarged sectional view taken along line 2-2 of the regulator of FIG. 1;

FIG. 3 is an enlarge sectional view taken along line 3-3 of FIG. 2;

FIG. 4 is a sectional view taken along line 4-4 of FIG. 1; and

FIG. 5 is a view partly in section showing the replaceable high-pressure cartridge removed from the regulator of FIG. 1.

Referring to the drawings, a pressure regulator 10 in accordance with the present invention includes a housing 12 formed of front and rear housing portions 14 and 16 respectively which are threadedly joined at 18. The housing portions 14 and 16 may be fabricated from any suitable material and in the present instance are illustrated as molded from a synthetic material. The front portion 14 of the housing is symmetrical around the axis of the threaded joint 18 and is characterized by a hollow cylindrical neck portion 20 having a closed end 22 extending from a hollow shoulder portion 24 of substantially larger diameter. The hollow shoulder portion 24 includes an inner land 26 upon which is seated a disc-shaped diaphragm 28 which is secured in position by the inner end 30 of the rear portion 16 of the housing.

The rear housing portion 16 includes a coaxial bore 32 which opens into a diaphragm chamber 34 formed by the diaphragm 28 and a cylindrical recess 36 in the rear housing portion. A replaceable high pressure cartridge 38 containing a fluid pressure regulating valve 40 is mounted in the bore 32. The cartridge 38 as shown in FIGS. 2, 3 and 5, includes a casing 42 which is symmetrical about its longitudinal axis. The valve 40 is disposed in a cylindrical coaxial valve chamber 44 within the casing 42. A coaxial outlet passage 46 passes through the inner end wall of the casing 42, communicating with the valve chamber 44 at the valve seat 48. A hexagonal valve element 50 having a resilient seating surface 52 is slidably disposed in the chamber 44 under the influence of compression spring 54. The spring 54 extends axially in the valve chamber between the valve element 50 and the inner end of neck portion 56 of a cylindrical connector 58 which is threadedly engaged within the outer end of the casing 42. An O-ring seal 60 seated in a suitable slot in the connector seals the connector to the casing. The connector includes a wrench hex shoulder 62 and at its outer end terminates in a threaded male connector 64. A coaxial fluid inlet passage 66 in the connector 58 opens into the valve chamber 44.

A reduced diameter portion 68 of the casing 42 fits snugly within the bore 32 of the rear housing portion. The cartridge is held in position by the engagement of the shoulder 70 of the casing with the recessed cartridge seat 72 of the housing and by a snap ring 74 which cooperates with annular slot 76 on the inner end of the casing. O-ring 78 seated in the slot 79 of the reduced diameter portion 68 of the casing seals the cartridge within the bore 32.

The pressure regulating valve 40 is actuated by a pin 80 which is coaxially secured to the diaphragm 28 by means of a threaded portion 82 passing through the diaphragm and threadedly engaging the diaphragm support plate 84. The pin 80, which is of a smaller diameter than the outlet passage 46 in the casing 42, extends into the passage 46 with the tip 86 thereof engaging the resilient seating surface 52 of valve element 50. A compression coil spring 88 extends coaxially between the support plate 84 and spring guide 90 carried by the pressure control shaft 92 which is threadedly engaged in the end 22 of the housing front portion 14. A pressure control knob 94 on the shaft 92 permits adjustment of the force of spring 88 on the diaphragm and hence, as will be more apparent from the description of the operation of the valve, the regulated fluid pressure.

The fluid flow through the regulator is controlled by a built-in needle valve 96 in the rear portion 16 of the housing. Fluid passes from the diaphragm chamber 34 through passage 98 to the needle valve element 100 which is positioned in needle valve chamber 102 by means of the integral threaded shaft 104 and control knob 106. The shaft 104 is threadedly engaged in the threaded insert 108 which is tightened against seal rings 110 in the rear housing portion. The flow through the valve is determined by the spacing of the conical valve element 100 from the end 112 of the chamber 102 which serves as the valve seat. As shown in FIG. 4, an outlet passage 114 carries the fluid flow from the needle valve into the outlet connector 116 for delivery.

A delivery pressure gauge 118 is connected by conduit 120 to a port in the rear housing portion 16 which opens into the diaphragm chamber 34. A spring-type safety release valve 122 in the rear housing portion 16 is connected by passage 124 to the diaphragm chamber 34 to vent the chamber to the atmosphere in the event of undue fluid pressure buildup.

For operation of the regulator, the connector 64 of the high-pressure cartridge is attached to a source of high-pressure fluid such as a high-pressure gas cylinder and the outlet connector 116 is connected to a suitable delivery tube. With the needle valve 96 initially closed, and with the pressure control knob 94 initially set to relax the spring 88, the high-pressure fluid is permitted to flow into the regulator through the inlet passage 66 such as by opening a valve on the fluid supply. The fluid will enter the valve chamber 44 but will not flow into the diaphragm chamber 34 since the valve element 50 is biased against valve seat 48 by spring 54.

By turning the knob 94 to apply a pressure by the spring 88 on the diaphragm, the pin 80 on the diaphragm will initially lift the valve element 50 from the valve seat 48 permitting a fluid flow around the hexagonal valve element 50 and around pin 80 in passage 46 into the diaphragm chamber 34 until the fluid pressure in the chamber acting against the force of spring 88 positions the diaphragm to permit a reseating of the valve element 50. By turning the knob 94 while watching the gauge 118, the desired delivery pressure of the regulator may be set prior to opening the needle valve 96. The spring 54 keeps the valve element 50 in contact with the tip 86 of pin 80 throughout the operation of the regulator. The needle valve 96 may be rotated as desired by manipulation of the knob 106 to provide the desired flow through the regulator.

In the event of undue pressure developing in the diaphragm chamber, the safety release valve 122 permits a direct release of the fluid therein to the atmosphere. Selection of the spring of the relief valve should of course be chosen of a suitable strength to release the fluid at a predetermined pressure.

The high-pressure cartridge may be easily replaced by unscrewing the front and rear housing portions and removing the snap ring 74. The cartridge may then be slid from the bore 32 and a new cartridge positioned in its place. This operation may be performed quickly without special tools. It is thus possible to select a cartridge of compatible material with the fluid flowing through the regulator. This is particularly important for systems involving a flow of corrosive gas such as hydrogen chloride.

The regulator structure which contributes to the ease of replacement of the cartridge is valve element 50 under the influence of spring 54 which follows the movements of the diaphragm pin 80 but which is not connected to the pin. This arrangement permits the separation of the front and rear housing portions without need for detachment of any connecting links between the diaphragm and pressure regulating valve.

The simplicity of the regulator and especially the high-pressure cartridge allows fabrication from a wide range of materials at a relatively low cost. The design permits in particular the utilization of high-strength glass for the structural elements to provide a regulator having a high degree of corrosion resistance.

I claim:

1. A fluid pressure regulator comprising a housing, said housing comprising separable front and rear housing portions, a diaphragm disposed between said housing portions defining with said rear portion a diaphragm chamber, a bore in said rear housing portion opening into said diaphragm chamber opposite said diaphragm, a removable cartridge slidably received within said bore, said cartridge having a pressure regulating valve assembly integral therewith, means demountably securing said cartridge in said bore in rotatable sealing relation therewith, said cartridge including a generally cylindrical casing, a valve chamber defined within said casing, a valve element slidably disposed in said valve chamber, a spring in said valve chamber urging said valve element toward a valve seat in said chamber, a fluid inlet opening into said valve chamber from the outer end of said cartridge, a fluid passage leading from said valve seat into said diaphragm chamber, a pin secured to said diaphragm aligned with and extending through said fluid passage and engaging said valve element, spring means in said front housing portion biasing said diaphragm toward said cartridge, and a fluid outlet passage in said rear housing portion leading from said diaphragm chamber, said means demountably securing said cartridge in said bore comprising a slot on the inner end of said cartridge and a snap ring adapted to engage said slot within the diaphragm chamber to prevent outward movement of the cartridge.